US009328687B2

(12) United States Patent
Jankovic et al.

(10) Patent No.: US 9,328,687 B2
(45) Date of Patent: May 3, 2016

(54) BIAS MITIGATION FOR AIR-FUEL RATIO SENSOR DEGRADATION

(71) Applicant: Ford Global Technologies, LLC, Dearborn, MI (US)

(72) Inventors: Mrdjan J. Jankovic, Birmingham, MI (US); Stephen William Magner, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 13/764,643

(22) Filed: Feb. 11, 2013

(65) Prior Publication Data

US 2014/0229089 A1 Aug. 14, 2014

(51) Int. Cl.

*B60T 7/12* (2006.01)
*F02D 41/30* (2006.01)
*F02D 41/14* (2006.01)
*F02D 41/20* (2006.01)

(52) U.S. Cl.

CPC ............ *F02D 41/30* (2013.01); *F02D 41/1401* (2013.01); *F02D 41/1402* (2013.01); *F02D 41/1454* (2013.01); *F02D 41/1473* (2013.01); *F02D 41/1495* (2013.01); *F02D 2041/142* (2013.01); *F02D 2041/143* (2013.01); *F02D 2041/1418* (2013.01); *F02D 2041/1431* (2013.01); *F02D 2041/1433* (2013.01); *F02D 2041/2027* (2013.01)

(58) Field of Classification Search

CPC .................... F02D 41/1495; F02D 2041/1433; F02D 41/1456; F02D 2041/1431; F02D 41/1401; F02D 41/1402; F02D 41/1454; F02D 2041/141; F02D 41/30; F02D 41/1473; F02D 2041/2027; F02D 2041/1418; F02D 2041/142; F02D 2041/143; Y02T 10/47; F01N 11/007; F01N 2560/025

USPC .......... 123/688, 690, 693, 694; 701/103–105, 701/109; 73/114.72, 114.73

See application file for complete search history.

(56) References Cited

U.S. PATENT DOCUMENTS

| | | | | | |
|---|---|---|---|---|---|
| 4,228,775 | A * | 10/1980 | Schweikert | ................... | 123/696 |
| 5,325,711 | A * | 7/1994 | Hamburg et al. | .......... | 73/114.73 |
| 5,672,817 | A * | 9/1997 | Sagisaka et al. | ........... | 73/114.72 |
| 5,797,384 | A * | 8/1998 | Kitagawa et al. | ............. | 123/674 |
| 6,286,493 | B1 * | 9/2001 | Aoki | ............................ | 123/690 |
| 6,591,822 | B2 * | 7/2003 | Dohta | .......................... | 123/672 |
| 6,785,601 | B2 * | 8/2004 | Yoshizawa et al. | ........... | 701/109 |
| 7,006,909 | B1 * | 2/2006 | May | .............................. | 701/102 |
| 7,021,300 | B2 * | 4/2006 | Maki et al. | .................... | 123/688 |

(Continued)

FOREIGN PATENT DOCUMENTS

| | | | | |
|---|---|---|---|---|
| JP | 2004245228 A | * | 9/2004 | .............. F02D 41/14 |
| JP | 2004245229 A | * | 9/2004 | .............. F02D 41/14 |

(Continued)

*Primary Examiner* — Joseph Dallo

(74) *Attorney, Agent, or Firm* — Julia Voutyras; Alleman Hall McCoy Russell & Tuttle LLP

(57) ABSTRACT

Various embodiments relating to air-fuel ratio control are described herein. In one embodiment a method includes adjusting fuel injection to an engine responsive to air-fuel ratio sensor feedback with a first control structure, and in response to an air-fuel ratio sensor asymmetric degradation, adjusting fuel injection to the engine responsive to air-fuel ratio sensor feedback with a second, different, control structure.

19 Claims, 7 Drawing Sheets

(56) References Cited

U.S. PATENT DOCUMENTS

| | | | | |
|---|---|---|---|---|
| 7,254,474 | B2 * | 8/2007 | Iihoshi et al. | 701/109 |
| 7,389,773 | B2 * | 6/2008 | Stewart et al. | 123/672 |
| 7,421,836 | B2 * | 9/2008 | Pallett et al. | 60/274 |
| 7,499,789 | B2 * | 3/2009 | Toda et al. | 701/109 |
| 7,742,870 | B2 * | 6/2010 | Yoshikawa | 701/108 |
| 7,769,534 | B1 * | 8/2010 | Xu et al. | 701/109 |
| 7,844,388 | B2 * | 11/2010 | Perschl et al. | 701/109 |
| 7,874,285 | B2 * | 1/2011 | Barnikow et al. | 123/688 |
| 7,900,616 | B2 * | 3/2011 | Saunders | 123/688 |
| 7,987,840 | B2 * | 8/2011 | Magner et al. | 123/703 |
| 8,145,409 | B2 | 3/2012 | Kerns et al. | |
| 2007/0051092 | A1 * | 3/2007 | Pallett et al. | 60/276 |
| 2008/0097683 | A1 * | 4/2008 | Yasui et al. | 701/104 |
| 2010/0242569 | A1 * | 9/2010 | Kerns et al. | 73/1.06 |
| 2011/0106411 | A1 * | 5/2011 | Anilovich et al. | 701/109 |

FOREIGN PATENT DOCUMENTS

| | | | |
|---|---|---|---|
| JP | 2009257221 A | * | 11/2009 |
| JP | 2009257225 A | * | 11/2009 |

* cited by examiner

BIAS MITIGATION FOR AIR-FUEL RATIO SENSOR DEGRADATION

BACKGROUND AND SUMMARY

An air-fuel ratio sensor may typically add a relatively small additional delay/lag to a feedback signal due to the sensor's protective covering and the time required for electro-chemical processing. A degraded sensor, possibly one where its protective covering is contaminated, may add more delay/lag. For example, the degraded sensor signal may be either delayed (but otherwise the same as the actual signal) or filtered (spread out in time with a reduced amplitude of the actual signal). In such cases, a feedback controller may not operate as desired due to higher than expected delay/lag.

In one example, to compensate for such delay/lag, the air-fuel controller may include a predictive delay compensation control structure, such as a Smith Predictor. The Smith Predictor may allow the controller to regulate the continuous dynamics of the system through a feed forward mechanism that compensates for delay/lag when the measured signal differs from the Smith Predictor's estimate.

However, the inventors have recognized several potential issues with such an approach. For example, the accuracy of the predictive delay compensation control structure may be affected by non-linear air-fuel ratio sensor degradation. For example, the predictive delay compensation control structure creates a bias for asymmetric faults in which a delay or filter lag is imposed on one direction of air-fuel ratio transition (e.g., lean to rich or rich to lean) but not the other direction. In particular, the bias leads to corrective overshoot and other feedback control errors, even if offsets are provided when the asymmetric air-fuel ratio sensor faults are identified. Such feedback control errors result in an increase of emissions of regulated gases NOx, CO, and NMHC.

The inventors herein have identified an approach for mitigating the bias in order to increase feedback control accuracy when an asymmetric fault of an air-fuel ratio sensor is identified. In one embodiment, a method includes adjusting a structure of the air-fuel controller to mitigate the delays caused by an asymmetric fault, rather than adjust an offset or gain parameters.

In one example, a method includes adjusting fuel injection to an engine responsive to air-fuel ratio sensor feedback with a first control structure. The method further includes in response to air-fuel ratio sensor asymmetry degradation, adjusting fuel injection to the engine responsive to air-fuel ratio sensor feedback with a second, different, control structure. In particular, the first control structure includes a Smith Predictor delay compensator that is dependent on linear dynamic operation of the air-fuel ratio sensor for suitable control accuracy. Further, the second control structure includes an internal model of behavior of the air-fuel ratio sensor degradation. The internal model may include a model of the actual asymmetric behavior of the degraded air-fuel ratio sensor. Accordingly, the controller provides accurate delay compensation via the Smith Predictor during dynamic linear operation and maintains control accuracy in response to identifying non-linear asymmetric operation by switching to an internal model that compensates for the asymmetric behavior. In this way, both the bias and the overshoot that would be caused by the Smith Predictor due to the asymmetric fault may be eliminated.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

DETAILED DESCRIPTION

The following description relates to an air-fuel control system that implements multiple different control structures to adjust air and/or fuel based on feedback from an air-fuel ratio sensor during different conditions. More particularly, the air-fuel control system may use a Smith Predictor delay compensator to compensate for combustion and exhaust propagation delay/lag effects based on linear behavior of the air-fuel ratio sensor. Furthermore, in response to detection of non-linear behavior of the air-fuel ratio sensor, such as an asymmetric fault, that may reduce accuracy of the Smith Predictor, the air-fuel control system may alter the control structure to a different control structure that mitigates the asymmetric behavior and achieves stoichiometric operation. In particular, the Smith Predictor delay compensator may be augmented with an additional model that includes the non-linear asymmetric behavior of the faulted air-fuel ratio signal, making the control system a type of non-linear internal model controller. In particular, the model of the non-linear asymmetric behavior may be a sensor fault model that is positioned in the feedback path of the Smith Predictor to mitigate both bias and overshoot that would otherwise be caused by correction of the Smith Predictor due to the asymmetric fault. In this way, the air-fuel control system may maintain control accuracy during linear and non-linear operation of the air-fuel ratio sensor.

Figure 1:
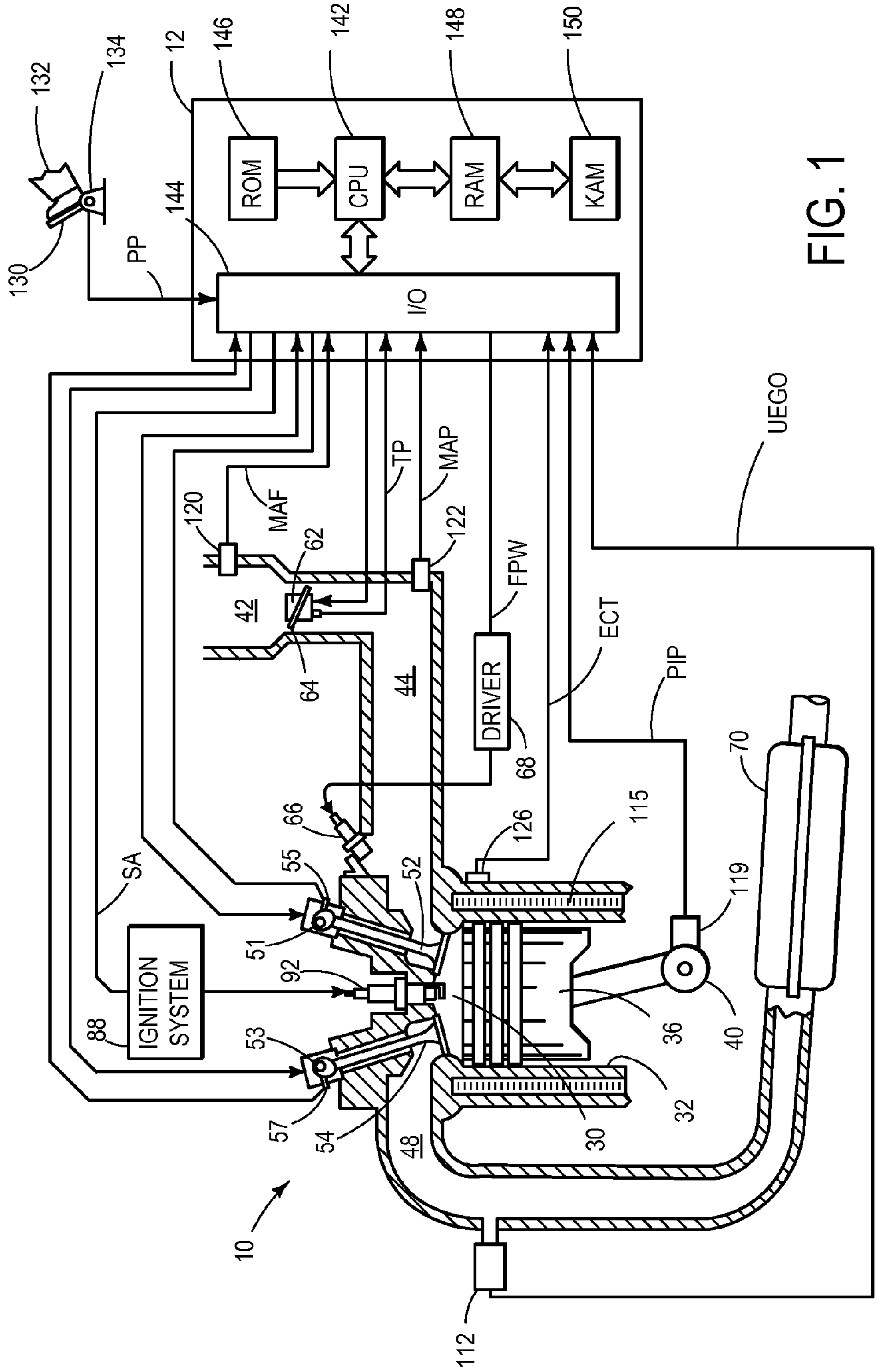
FIG. 1 shows an engine system according to an embodiment of the present disclosure.

FIG. 1 is a schematic diagram showing one cylinder of multi-cylinder engine 10, which may be included in a propulsion system of a vehicle in which an exhaust gas sensor 126 may be utilized to determine an air-fuel ratio of exhaust gas produced by engine 10. The air fuel ratio (along with other operating parameters) may be used for feedback control of engine 10 in various modes of operation as part of an air-fuel control system. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Air-fuel ratio exhaust gas sensor 126 is shown coupled to exhaust passage 48 of exhaust system 50 upstream of emission control device 70. Sensor 126 may be any suitable sensor for providing an indication of exhaust gas air-fuel ratio such as a linear oxygen sensor or UEGO (universal or wide-range exhaust gas oxygen). Other embodiments may include different exhaust sensor such as a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned downstream of emission control 70.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may be used in the air-fuel ratio sensor control systems and methods described in further detail below. For example, controller 12 may be configured to adjust fuel injection to the engine with a first control structure responsive to feedback from the air-fuel ratio sensor as well as other sensors. Further, the controller 12 may be configured to utilize sensor feedback to determine air-fuel sensor degradation, such as an asymmetric degradation. U.S. Pat. No. 8,145,409 provides further detailed explanation of various methods for determining air-fuel ratio sensor degradation. In response to determining an air-fuel ratio sensor asymmetric degradation, the controller 12 may be configured to adjust fuel injection to the engine responsive to air-fuel ratio sensor feedback with a second, different, control structure.

Note storage medium read-only memory 106 can be programmed with computer readable data representing instructions executable by processor 102 for performing the methods described below as well as other variants.

Figure 2:
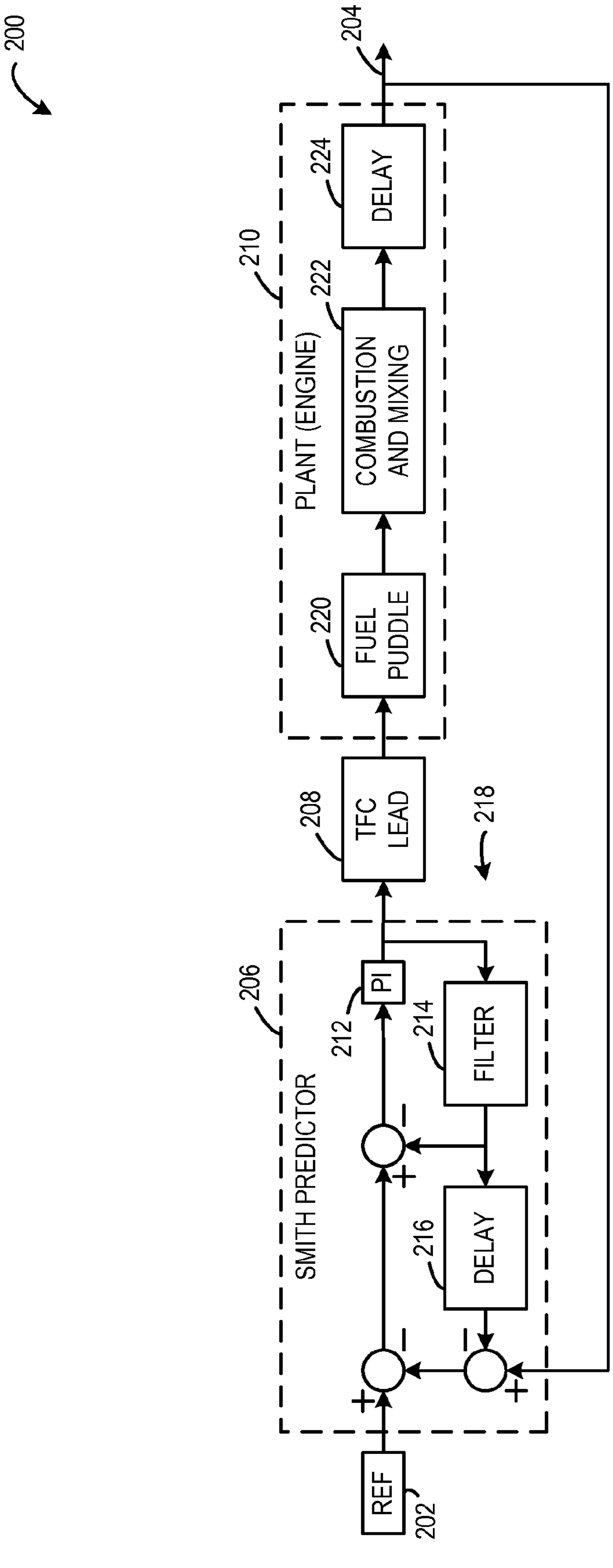
FIG. 2 shows a delay compensated closed loop fuel control system according to an embodiment of the present disclosure.

FIG. 2 shows a delay compensated closed loop fuel control system 200 according to an embodiment of the present disclosure. The control system 200 operates based on feedback from a linear or universal exhaust gas oxygen (UEGO) sensor. A reference source 202 generates a control signal at the input of control system 200 that is adjusted by various intermediate control blocks to provide a desired fuel control signal 204 at the output of the control system. The control signal may be generated by the reference source based on the desired air-fuel ratio, which another part of the control system determines, to optimize emissions (an air-fuel square wave helps increase catalyst efficiency), fuel economy, and drivability. In these figures, the reference is assumed to be a normalized air-fuel ratio that is a value of 1 when the fuel and air mixture inducted into the combustion cylinders has exactly enough fuel and oxygen to burn without any leftover fuel or oxygen (referred to as a stoichiometric mixture). The control system

200 includes a delay compensated closed loop fuel control structure, more particularly, a Smith Predictor (SP) control structure 206, a transient fuel control (TFC) lead compensator 208, and a plant control structure 210.

The SP control structure 206 is configured to compensate for a response delay of the UEGO sensor. The SP control structure accommodates known delay/filtering of the system so as to correctly compensate for air-fuel disturbances. A difference of the control signal from the reference source 202 and the feedback of the output of the control system is provided to a proportional-integral (PI) controller 212. The difference of the control signal and the feedback may be modified by an error produced by an inner feedback loop 218 of the SP control structure.

Within the inner feedback loop 218, an SP filter or prediction block 214 is connected in series with an SP delay block 216 so that the SP delay block receives the output of the SP filter block. The control signal output from the PI controller 212 is fed back to the input of the SP filter block 214. The SP filter block 214 uses a time constant that is a function of engine speed and load (normalized cylinder air charge). The SP delay block 216 uses a delay that is also a function of engine speed and load. The SP control structure provides two estimated signals including the response of the system with the pure delay (output of 216) and without it (output of 214). The SP control structure allows the PI controller to essentially operate as if the actual system did not have the pure delay or is delay-free, as long as the output of the delay block 216 and the measured UEGO signal match one another.

The TFC lead compensator 208 introduces modifiers that are engine temperature dependent so as to compensate for the effects of wall wetting. The TFC lead compensator is introduced to remove or reduce the effects of wall wetting in which a fraction of injected fuel sticks to the fuel injection port walls and forms a fuel puddle that later evaporates. The rate of evaporation is dependent on engine temperature so disturbances caused by the evaporating fuel can be estimated based on the engine temperature.

The TFC lead compensator 208 receives the delay-compensated control signal from the output of the PI controller 212. The TFC lead compensator 208 adjusts the control signal received from the PI controller 212 based on an engine temperature dependent time constant and a temperature dependent gain to produce an engine temperature dependent control signal. The control signal that is modified by the engine temperature dependent time constant and high frequency gain is fed to the plant (engine) represented by the structure 210.

The plant structure 210 includes various blocks that represent physical components of the engine that are modeled for fuel control. The plant includes a fuel puddle block 220, a combustion and mixing block 222, and a delay block 224. The fuel puddle block 220 receives the fuel from the injector driven by the signal output from the TFC lead compensator 208. The fuel puddle block models an estimated amount of fuel that sticks to intake port walls and forms a fuel puddle that later evaporates to affect the air-fuel ratio, and may be characterized by an X-Tau model, as one example. The fuel puddle block 220 is connected in series to the combustion and mixing block 222 and provides input to the combustion and mixing block. These plant model blocks in 210 are presented here as a conceptual aid to clarify what aspects of the real physical system are addressed by the closed loop fuel-air control. For example, block 220 is addressed by block 208 and blocks 222 and 224 correspond to blocks 214 and 216.

The block 222 models the overall filtering behavior created by combustion and exhaust manifold gas mixing and generally represented as a first order filter in block 214. If a simulation model is constructed based on FIG. 2, the path way in 210 is an appropriate location to insert fueling errors (disturbances) that exist in a real engine such as inaccurate fuel delivery (injector variability, fuel pressure, etc.), fuel that doesn't match expected chemical composition (e.g., gasoline-ethanol blends), fuel that enters through the canister purge valve, fuel from a puddle that develops after a large airflow change that the TFC failed to completely account for, etc.). A disturbance may be an error that the system designers cannot accurately anticipate and thus has to be countered by closed loop control. The combustion and mixing block 222 is connected in series with the delay block 224 and provides input to the delay block.

The delay block 224 models delays associated with internal combustion and exhaust gas flow dynamics of the engine of the vehicle. The resulting output of the delay block 224 is processed by the UEGO sensor at 204 and converted into the normalized air-fuel (LAM) signal. This "measured" LAM signal from block 224 (note: the block diagram in FIG. 2 simplifies the actual capture and voltage to LAM translation process of the real system) is the feedback signal the controller 206 uses.

One issue with the control system 200 of FIG. 2 is that the SP with PI feedback control structure causes a bias of the fuel control signal when the UEGO sensor degrades and behaves non-linearly, such as due to an asymmetric fault. In particular, the SP control structure causes the control signal to overshoot the command signal during air-fuel ratio transitions that are in the direction of the asymmetric fault. The SP feedback allows higher PI gains to be used that increase the overshoot. The amount of bias is based on the type of detected fault, however the actual bias is subject to the extent of actual air-fuel ratio transitions (how large, how often). As part of the control approach, the SP control structure must make assumptions about linear operation for typical air-fuel transitions. If vehicle operation violates those assumptions (e.g., non-linear air-fuel ratio behavior), then the accuracy of the SP control structure may be reduced and a bias may be created. The SP control system 200 can accommodate known delay and filtering behavior of the physical system and likewise can be modified to accommodate known sensor degradation as well.

Figure 3:
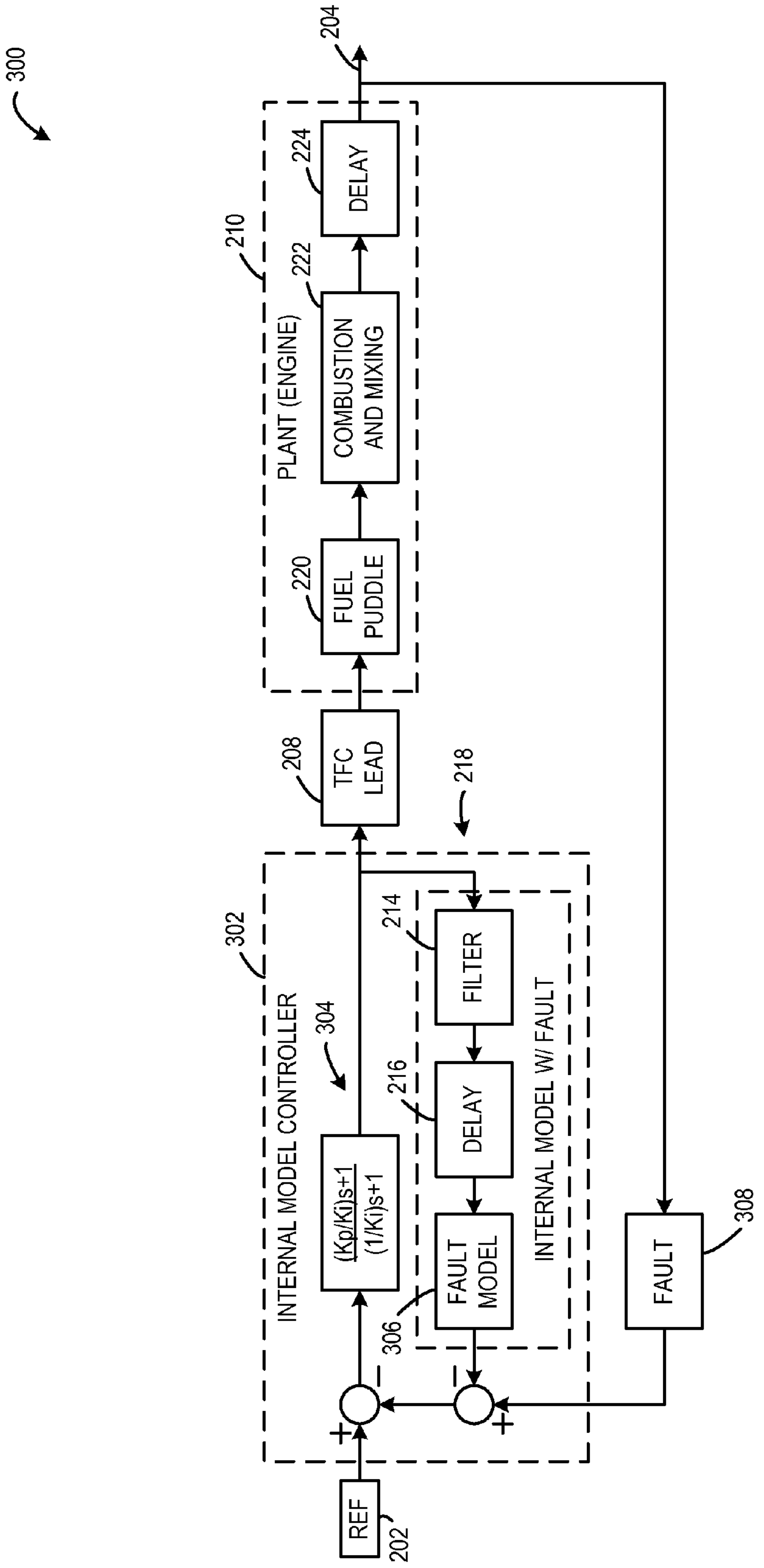
FIG. 3 shows a delay compensated closed loop fuel control system having an internal model of sensor degradation according to an embodiment of the present disclosure.

FIG. 3 shows a delay compensated closed loop fuel control system 300 having a model of sensor degradation in an internal model according to an embodiment of the present disclosure. The internal model of the fault may be configured to mitigate bias and overshoot that would otherwise be created by the SP control structure during non-linear operation, such as due to an asymmetric fault of the UEGO sensor. In particular, the SP control structure 206 of the control system 200 is transformed into an equivalent internal model controller 302 in the control system 300. The SP control structure is transformed by separating the forward path 304 of the PI controller (which has a Laplace transform of (Kp+Ki/s) from the internal feedback loop with the filter block 214 (which has a Laplace transform of 1/(TCs+1)) and delay block 216. In particular, a copy of the filter block is added to the forward path 304 of the PI controller and the result is arithmetically reduced. In the illustrated embodiment, it is assumed that Kp=Ki*TC, which results in a Laplace transform of ((Kp/Ki)s+1)/(1/Ki)s+1 in the forward path 304 of the internal model controller 302.

The transformed Smith Predictor return path 218 is augmented with a fault model block 306. The fault model block 306 is configured to reproduce a faulted air-fuel ratio signal. In particular, the fault model block 306 can recreate any one or more of six discrete degradation behaviors indicated by delays in the response rate of air-fuel ratio readings generated by the UEGO sensor during rich-to-lean transitions and/or lean-to-rich transitions.

Figure 4:
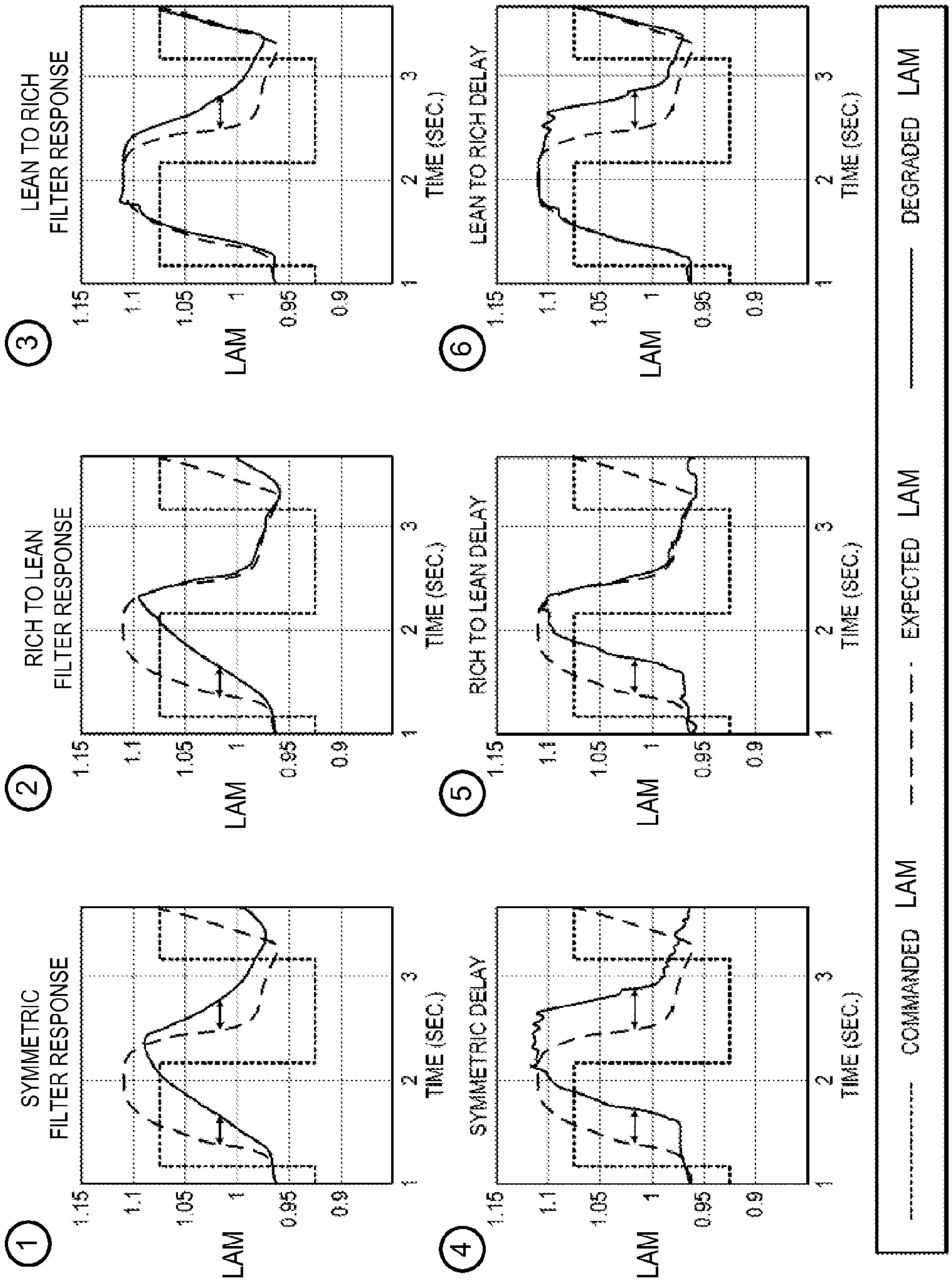
FIG. 4 shows six discrete types of exhaust gas sensor degradation behaviors.

FIG. 4 shows the six discrete types of exhaust gas sensor degradation behaviors. The graphs plot normalized air-fuel ratio (LAM) versus time (in seconds). In each graph, the dotted line indicates a commanded LAM signal that may be sent to engine components (e.g., fuel injectors, cylinder valves, throttle, spark plug, etc.) to generate an air-fuel ratio that progresses through a cycle comprising one or more lean-to-rich transitions and one or more rich-to-lean transitions. In each graph, the dashed line indicates an expected LAM response time of an exhaust gas sensor. In each graph, the solid line indicates a degraded LAM signal that would be produced by a degraded exhaust gas sensor in response to the commanded LAM signal. In each of the graphs, the double arrow lines indicate where the given degradation behavior type differs from the expected LAM signal.

A first type of degradation behavior is a symmetric filter response type that includes slow exhaust gas sensor response to the commanded LAM signal for both rich-to-lean and lean-to-rich modulation. In other words, the degraded LAM signal may start to transition from rich-to-lean and lean-to-rich at the expected times but the response rate may be lower than the expected response rate, which results in reduced lean and rich peak times.

A second type of degradation behavior is an asymmetric rich-to-lean filter response type that includes slow exhaust gas sensor response to the commanded LAM signal for a transition from rich-to-lean air-fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean while normal during lean-to-rich transition.

A third type of behavior is an asymmetric lean-to-rich filter response type that includes slow exhaust gas sensor response to the commanded LAM signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is slow (or lower than expected) during the transition from lean-to-rich and not the transition from rich-to-lean.

A fourth type of degradation behavior is a symmetric delay type that includes a delayed response to the commanded LAM signal for both rich-to-lean and lean-to-rich modulation. In other words, the degraded LAM signal may start to transition from rich-to-lean and lean-to-rich at times that are delayed from the expected times, but the respective transition may occur at the expected response rate, which results in shifted lean and rich peak times.

A fifth type of degradation behavior is an asymmetric rich-to-lean delay type that includes a delayed response to the commanded LAM signal from the rich-to-lean air/fuel ratio. In other words, the degraded LAM signal may start to transition from rich-to-lean at a time that is delayed from the expected time, but the transition may occur at the expected response rate, which results in shifted lean peak times. This type of behavior may be considered asymmetric because the response of the exhaust gas sensor is delayed from the expected start time during a transition from rich-to-lean and not during the transition from lean-to-rich.

A sixth type of behavior is an asymmetric lean-to-rich delay type that includes a delayed response to the commanded LAM signal from the lean-to-rich air/fuel ratio. In other words, the degraded LAM signal may start to transition from lean-to-rich at a time that is delayed from the expected time, but the transition may occur at the expected response rate, which results in shifted rich peak times. This type of behavior may be considered asymmetric because the response of the exhaust gas sensor is delayed from the expected start time during a transition from lean-to-rich and not during the transition from rich-to-lean.

Note an asymmetric degradation behavior may increase the measured response for both directions (i.e., rich-to-lean and lean-to-rich). This effect may become more pronounced as the magnitude of an asymmetric degradation increases. It will be appreciated that a degraded exhaust gas sensor may exhibit a combination of two or more of the above described degradation behaviors.

Returning to FIG. 3, the fault model block 306 may be particularly configured to mitigate a bias created by the Smith Predictor due to non-linear operation as a result of UEGO sensor degradation. The fault model block 306 augments the Smith Predictor delay compensator with a model that includes the non-linear asymmetric behavior of the faulted UEGO signal in the internal feedback loop 218, making the control system a type of non-linear Internal Model Controller. In particular, the fault model block 306 is configured to produce a degraded signal which emulates the output of 308. The fault model block 306 is provided with a type of fault (e.g., one of the six degradation behaviors described above) and a corresponding magnitude of the fault. The fault model block 306 uses the information to recreate the behavior of the fault in the internal model controller so as to compensate for the fault behavior. In this way, the bias of the Smith Predictor can be compensated for during non-linear operation. In other words, the fault model removes air-fuel ratio excursions in both the faulted and actual UEGO signals.

It will be appreciated that an amount of bias that actually occurs is dependent on the air-fuel ratio signal transitions. In the absence of any reference command change or air-fuel ratio disturbances (e.g., mass flow changes creating transient fuel errors, canister purge operation, etc.), the air-fuel ratio will remain flat, and the asymmetric fault effect will create no bias.

In contrast to the control system 300, a typical feed forward compensator without an internal model would have to make additional assumptions about the amount of air-fuel ratio transitions that occur during operation and would have to be calibrated for a given drive cycle in order to maintain signal accuracy. In particular, the control system 200 does not include a model of the behavior of the asymmetry degradation, and therefore causes a bias in the air-fuel ratio control signal. Moreover, any unexpected air-fuel ratio disturbances would reduce the effectiveness and accuracy of any attempted feed-forward bias correction. On the other hand, the control system 300 self adjusts for the degree, or even total absence, of air-fuel ratio transitions. Accordingly, the control system 300 reduces potential calibration effort and is more robust to unknown air-fuel ratio disturbances relative to a typical feed forward compensator. Moreover, the control system 300 eliminates air-fuel ratio excursions that exceed the reference signal, whereas a feed forward correction of the bias by adjusting a reference signal (e.g., square wave) would still result in large excursions, possibly affecting drivability.

Components of control system 300 that may be substantially the same as those of control system 200 are identified in the same way and are described no further. However, it will be noted that components identified in the same way in different embodiments of the present disclosure may be at least partly different.

Figure 5:
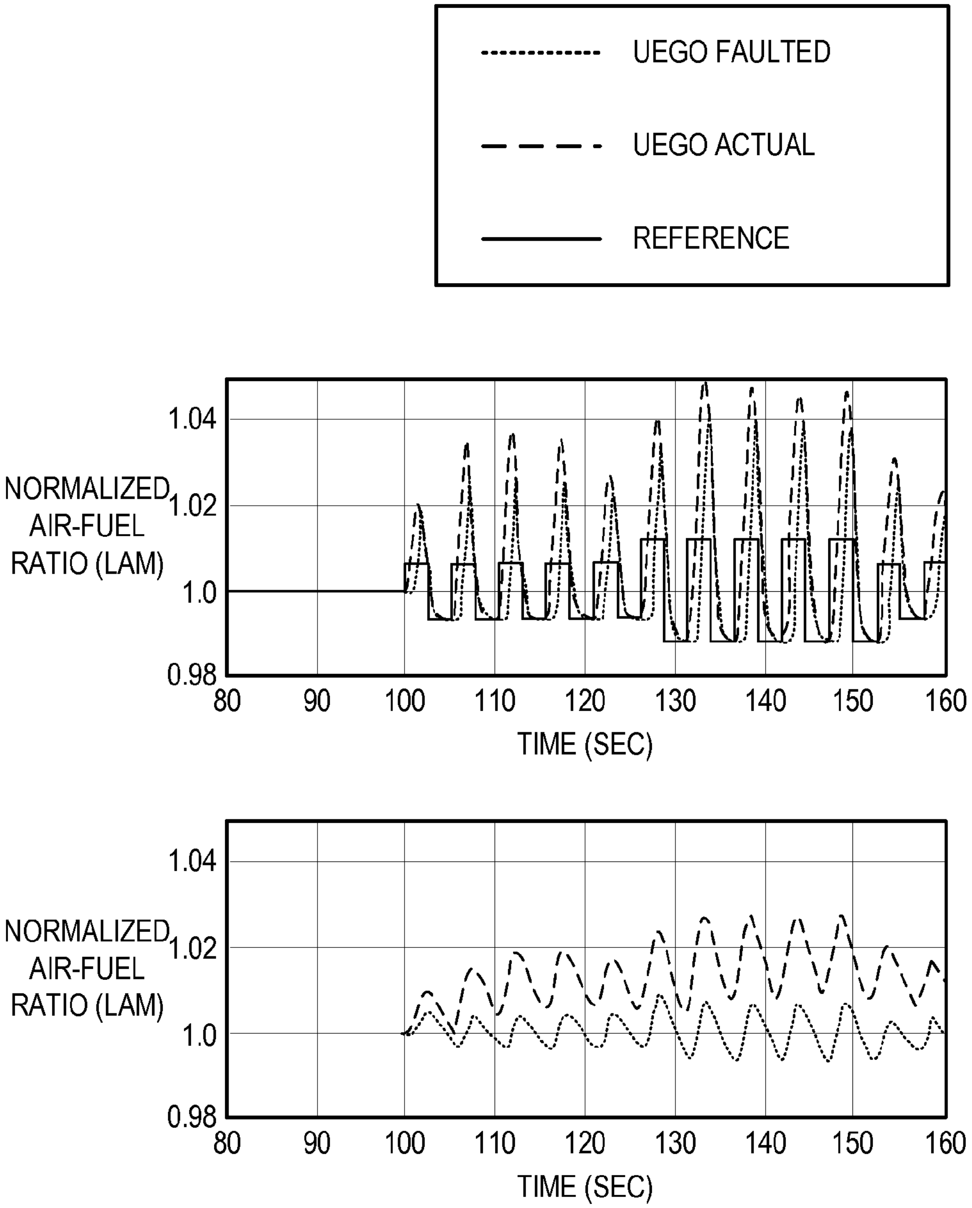
FIG. 5 shows an example of non-mitigated air-fuel ratio control during an asymmetric lean to rich delay fault of an air-fuel ratio sensor.

FIG. 5 shows an example of non-mitigated air-fuel ratio control during an asymmetric rich to lean delay fault of an air-fuel ratio sensor. For example, the illustrated control behavior may be exhibited by the control system 200 shown in FIG. 2. The graphs plot normalized air-fuel ratio (LAM) versus time (in seconds). In the upper plot, the solid trace is the commanded reference lam, the dashed trace is the actual lam (as it would be measured by a non-faulted UEGO), and the dotted trace is the output of a faulted UEGO sensor. In the lower plot, the actual lam (dashed) and the faulted UEGO (dotted) signals are low-pass filtered to show that signals' overall bias, which is important to demonstrate here because the actual lam will pass through a catalyst which will react poorly to persistent air-fuel bias. Due to the imposed UEGO delay fault, both the actual lam and faulted UEGO overshoot the lean commanded value, however the actual lam overshoots more. The SP controller evaluates the faulted UEGO signal, and falsely computes that the overall bias is roughly 0 (lam of 1.0 is 0 bias), while the average air-fuel ratio of the actual exhaust gas going into the catalyst shown by the dashed line is not stoichiometric (the actual signal is greater than the stoichiometric value of 1).

Note that a lean to rich delay would create an equivalent, but opposite rich bias. Further, note also that the size of the bias depends on the size of the input excitation. For example, a larger amplitude of the actual LAM signal would result in a larger bias.

Figure 6:
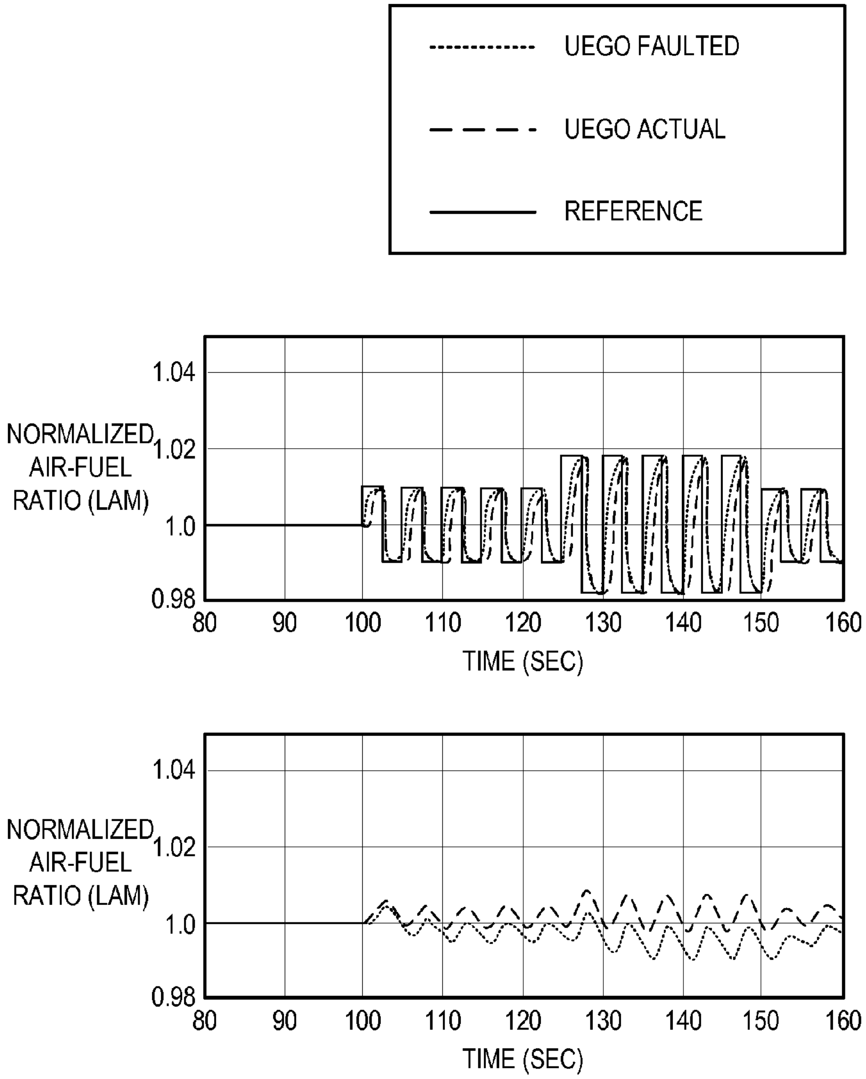
FIG. 6 shows an example of mitigated air-fuel ratio control during an asymmetric lean to rich delay fault of an air-fuel ratio sensor.

FIG. 6 shows an example of mitigated air-fuel ratio control during an asymmetric rich to lean delay fault of an air-fuel ratio sensor. For example, the illustrated control behavior may be exhibited by the control system 300 shown in FIG. 3. The graphs plot normalized air-fuel ratio (LAM) versus time (in seconds). As in FIG. 5, the solid trace is the LAM reference, the dashed trace is the actual LAM, and the dotted trace is the faulted UEGO. The upper plot indicates that the modified controller 306 avoids the overshoot of both actual lam and the faulted UEGO signal. The lower plot shows that the actual LAM is now maintained on average about the value of 1.0 and thus has no persistent bias. The filtered faulted UEGO is shifted rich, due to the mitigating actions of the modified controller, as expected. The air-fuel ratio control accuracy is maintained even during non-linear operation as a result of an asymmetric fault of the UEGO sensor.

The configurations illustrated above enable various methods for controlling an air-fuel ratio in an engine of a vehicle. Accordingly, some such methods are now described, by way of example, with continued reference to above configurations. It will be understood, however, that these methods, and others fully within the scope of the present disclosure, may be enabled via other configurations as well.

Figure 7:
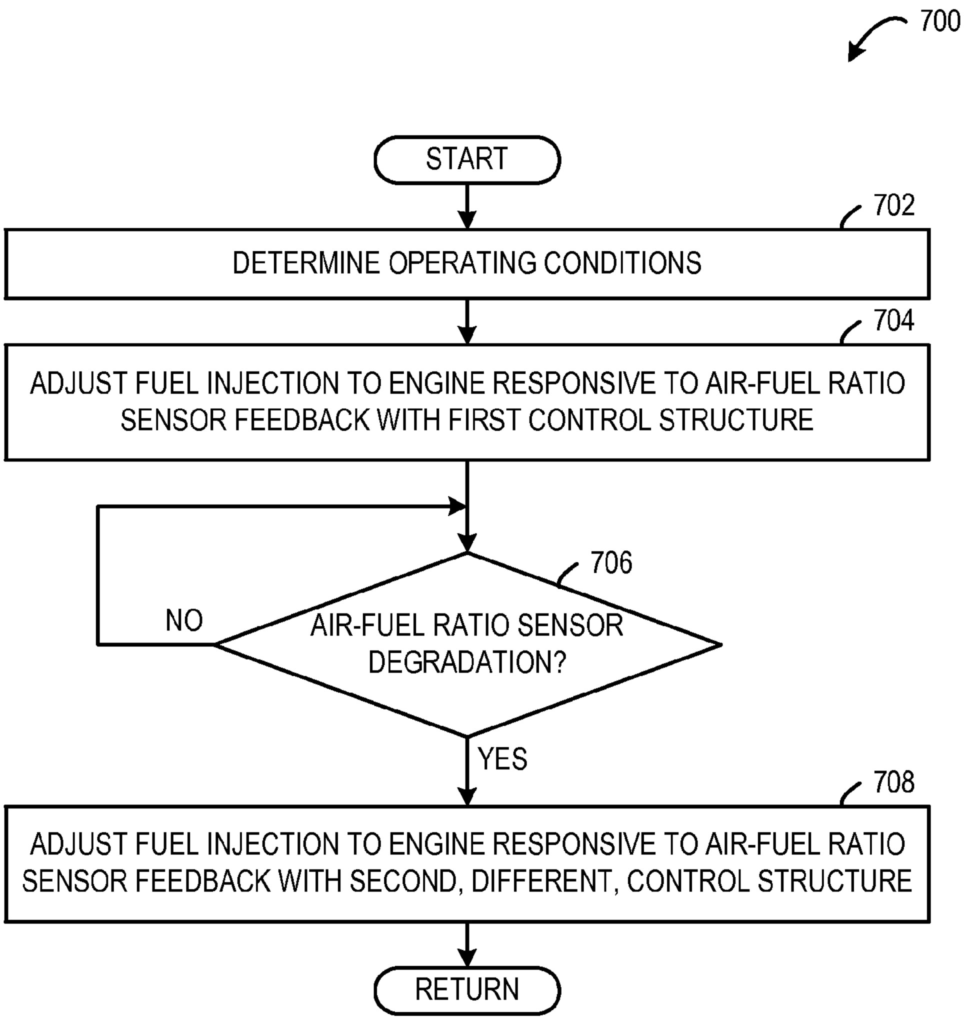
FIG. 7 shows a method for controlling fuel injection according to an embodiment of the present disclosure.

FIG. 7 shows a method 700 for controlling fuel injection according to an embodiment of the present disclosure. The method 700 may be performed to mitigate the effects of degradation of an air-fuel ratio sensor on air-fuel ratio control. In particular, the method 700 may be performed to eliminate a bias from an air-fuel ratio control signal during non-linear operation due to an asymmetric fault of the air-fuel ratio sensor. In one example, the method 700 may be performed by controller 12.

At 702, the method 700 may include determining operating conditions of a vehicle. For example, determining operating conditions may include receiving sensor signals that are indicative of operating parameters of the vehicle and calculating or inferring various operating parameters. Further, determining operating conditions may include determining the state of components and actuators of the vehicle.

At 704, the method 700 may include adjusting fuel injection to an engine responsive to air-fuel ratio sensor feedback with a first control structure. For example, the first control structure may include a delay compensated closed loop fuel control structure. More particularly, the delay compensated closed loop fuel control structure may include a Smith Predictor delay compensator. The Smith Predictor delay compensator may compensate for natural combustion and exhaust propagation delay/lag effects during linear operation of the air-fuel ratio sensor. The delay compensated closed loop fuel control structure may not include a model of an air-fuel ratio sensor asymmetry degradation.

At 706, the method 700 may include determining whether the air-fuel ratio sensor has degraded. More particularly, the method may include detecting whether the air-fuel ratio sensor has degraded such that the air-fuel ratio sensor exhibits non-linear behavior that violates operating assumption of the Smith Predictor delay compensator. In one example, the method determines whether an asymmetric fault in which a delay is imposed on one direction of an air-fuel ratio transition has occurred. If it is determined that the air-fuel ratio sensor had degraded, then the method 700 moves to 708. Otherwise, the method 700 returns to 706.

At 708, the method 700 may include adjusting fuel injection to the engine responsive to air-fuel ratio sensor feedback with a second, different, control structure. For example, the second control structure may include an internal model of the behavior of the air-fuel ratio sensor degradation in an internal feedback loop. The internal model may include a model of behavior of the air-fuel ratio sensor degradation. In the case where the sensor degradation includes an asymmetric fault, the internal model may replicate the asymmetric fault's behavior via a fault transfer function having detected direction and magnitude of the asymmetric fault as inputs. The direction and magnitude of the asymmetric fault may be detected from air-fuel ratio sensor feedback of the asymmetric fault. The internal model may adjust fuel injection by shifting a mean of a commanded air-fuel ratio or altering a duty cycle of a commanded square wave based on the direction and magnitude of an asymmetric fault.

By incorporating an internal model of the sensor degradation in the fuel control structure, Both the bias and the overshoot caused by the Smith Predictor delay compensator due to the asymmetric fault are eliminated from the air-fuel ratio signal. In this way, air-fuel ratio control accuracy may be maintained even during sensor degradation conditions.

It will be appreciated that during non-degraded operation where the air-fuel ratio sensor behaves in a linear fashion, the internal model does not affect operation of the delay compensation control structure since no fault is present.

It will be understood that the example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into computer readable storage medium in an electronic control system. It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the articles, systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method, comprising:

adjusting fuel injection to an engine responsive to air-fuel ratio sensor feedback with an air-fuel controller having a first control structure which includes a predictor; and in response to an air-fuel ratio sensor asymmetric degradation, transforming the first control structure into a second, different, control structure which includes a model configured to reproduce a fault, rather than adjusting an offset or gain parameters, and adjusting fuel injection to the engine responsive to air-fuel ratio sensor feedback with the second control structure.

2. The method of claim 1, wherein the first control structure includes a delay compensated closed loop fuel control structure without an asymmetric fault model, wherein the model included in the second, different, control structure is such a model, and wherein the fault reproduced by the model in the second, different, control structure is a faulted air-fuel ratio signal.

3. The method of claim 2, wherein the predictor is a Smith Predictor delay compensator that is included in the delay compensated closed loop fuel control structure.

4. The method of claim 2, wherein the model is configured to recreate one or more of six discrete degradation behaviors indicated by delays in a response rate of air-fuel ratio readings generated by the air-fuel ratio sensor during rich-to-lean transitions and/or lean-to-rich transitions.

5. The method of claim 4, wherein the model adjusts fuel injection by shifting a mean of a commanded air-fuel ratio or altering a duty cycle of a commanded square wave based on a direction and magnitude of an asymmetric fault of the air-fuel ratio sensor.

6. The method of claim 1, wherein the predictor of the first control structure is a Smith Predictor control structure comprising a PI controller in a forward path and a filter block and a delay block in an internal feedback loop.

7. The method of claim 1, wherein the air-fuel ratio sensor asymmetric degradation is an asymmetric fault in which a delay is imposed on one direction of an air-fuel ratio transition.

8. A vehicle comprising:

an engine that exhausts gas into an exhaust system;

an air-fuel ratio sensor positioned in the exhaust system to measure an air-fuel ratio of gas exhausted by the engine; and a controller including a processor and electronic storage medium holding instructions that when executed by the processor:

adjust fuel injection to the engine responsive to air-fuel ratio sensor feedback with an air-fuel controller having a first control structure including a delay compensated closed loop fuel control structure; and in response to detecting an asymmetric fault of the air-fuel ratio sensor, transforming the first control structure into a second, different, control structure which includes a model configured to reproduce a faulted air-fuel ratio signal rather than adjusting an offset or gain parameters of the first control structure and adjusting fuel injection to the engine responsive to air-fuel ratio sensor feedback with the second control structure.

9. The vehicle of claim 8, wherein the delay compensated closed loop fuel control structure includes a Smith Predictor delay compensator.

10. The vehicle of claim 8, wherein the model configured to reproduce a faulted air-fuel ratio signal is an internal model of behavior of the air-fuel ratio sensor degradation.

11. The vehicle of claim 10, wherein the internal model adjusts fuel injection by shifting a mean of a commanded air-fuel ratio or altering a duty cycle of a commanded square wave based on a direction and a magnitude of an asymmetric fault of the air-fuel ratio sensor.

12. The vehicle of claim 8, wherein the air-fuel ratio sensor is a universal exhaust gas oxygen sensor.

13. A method, comprising:

in response to detecting an asymmetric fault of an air-fuel ratio sensor, transforming a structure of an air-fuel controller of an engine that is responsive to air-fuel ratio sensor feedback and that includes a delay compensated closed loop fuel control structure to incorporate a model of the asymmetric fault's behavior, the model configured to reproduce a faulted air-fuel ratio signal, rather than adjusting an offset or gain parameters, and adjusting fuel injection to the engine based on the faulted air-fuel ratio signal.

14. The method of claim 13, wherein the asymmetric fault's behavior includes a fault transfer function having detected direction and magnitude of the asymmetric fault as inputs.

15. The method of claim 14, wherein an internal model adjusts fuel injection by shifting a mean of a commanded air-fuel ratio or altering a duty cycle of a commanded square wave based on the direction and magnitude of the asymmetric fault.

16. The method of claim 13, wherein the model follows a delay and a filter in an internal feedback loop of a Smith Predictor delay compensator.

17. The method of claim 16, wherein a forward path of a PI controller is separated from the internal feedback loop of the Smith Predictor delay compensator, the internal feedback loop of the Smith Predictor delay compensator arranged in order of the filter, followed by the delay, followed by the model configured to reproduce a faulted air-fuel ratio signal.

18. The method of claim 16, further comprising:

during non-degraded operation of the air-fuel ratio sensor, adjusting fuel injection to the engine based on the delay compensated closed loop fuel control structure.

19. The method of claim 18, wherein the delay compensated closed loop fuel control structure includes a Smith Predictor delay compensator.

* * * * *